United States Patent [19]
Riley et al.

[11] Patent Number: 5,226,036
[45] Date of Patent: * Jul. 6, 1993

[54] NETWORK DIAGNOSTIC TOOL

[75] Inventors: Martyn J. Riley; Roland J. Burns, both of Bristol, United Kingdom

[73] Assignee: Hewlett Packard Company, Palo Alto, Calif.

[*] Notice: The portion of the term of this patent subsequent to Sep. 10, 2008 has been disclaimed.

[21] Appl. No.: 475,694

[22] Filed: Feb. 6, 1990

[30] Foreign Application Priority Data

Feb. 8, 1989 [EP] European Pat. Off. ........ 89301198.1

[51] Int. Cl.$^5$ .............................................. H04J 3/14
[52] U.S. Cl. ...................................... 370/15; 370/13; 370/17; 342/125
[58] Field of Search ........... 370/13, 14, 15, 17, 370/24, 32, 32.1, 66, 67, 77, 85.1, 94.1, 85.7, 95.1, 29, 85.8, 95.2; 455/5, 9, 14, 18, 49, 53, 54, 56, 67, 68, 69; 379/1, 6, 9, 10, 24, 25, 26, 27, 28, 29; 340/825.06, 825.1, 825.18, 825.5, 825.51, 825.08; 371/20.1, 20.3, 20.4, 20.5, 15.1, 19; 342/125, 134, 135, 126, 458; 324/512, 513, 527, 531–535

[56] References Cited

U.S. PATENT DOCUMENTS

| | | | |
|---|---|---|---|
| 3,919,708 | 11/1975 | Pudsey | 342/125 |
| 3,953,856 | 4/1976 | Hammack | 342/458 |
| 4,297,701 | 10/1981 | Henriques | 342/125 |
| 4,562,573 | 12/1985 | Murano et al. | 370/85.1 |
| 4,594,705 | 6/1986 | Yahata et al. | 370/13 |
| 4,694,453 | 9/1987 | Kobayashi et al. | 370/85.1 |
| 4,750,036 | 6/1988 | Martinez | 358/84 |
| 4,764,980 | 8/1988 | Sakaguchi et al. | 370/15 |
| 4,914,735 | 4/1990 | Ichiyoshi | 342/125 |
| 4,947,425 | 8/1980 | Grizmala et al. | 370/32.1 |
| 5,048,009 | 9/1991 | Conrad | 370/17 |

*Primary Examiner*—Douglas W. Olms
*Assistant Examiner*—Alpus H. Hsu

[57] ABSTRACT

A network diagnostic tool for determining the position of a workstation on a local area network (LAN) having timer and echo stations at each end of a multi-access bus. Signals from the LAN workstations propagate in both directions along the bus. When the signals are so propagated, by measuring the time delay between receipt of a data packet and its echo at the timer station, the position of the workstation along a bus can be determined in accordance with that time delay.

19 Claims, 5 Drawing Sheets

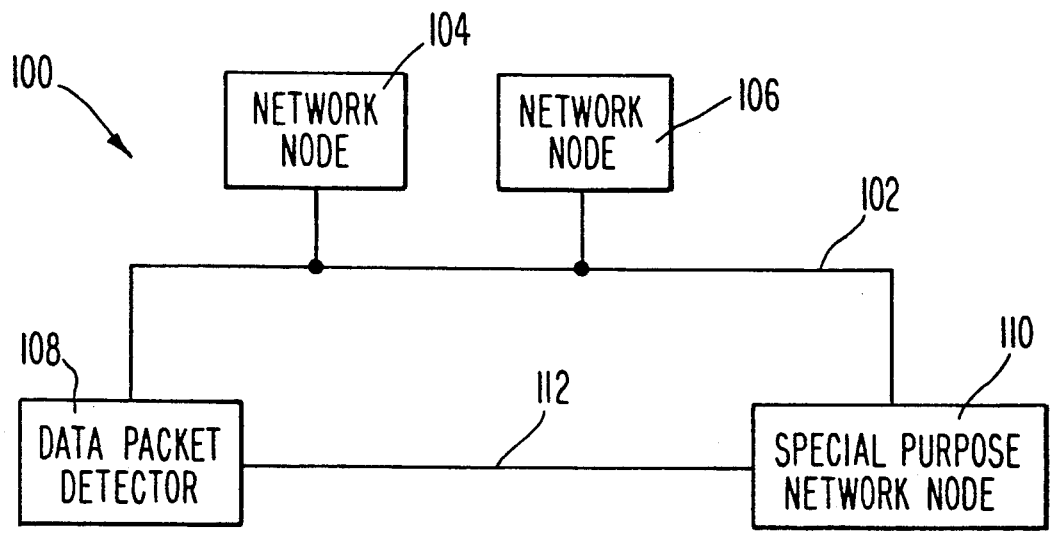
_Fig. 4_
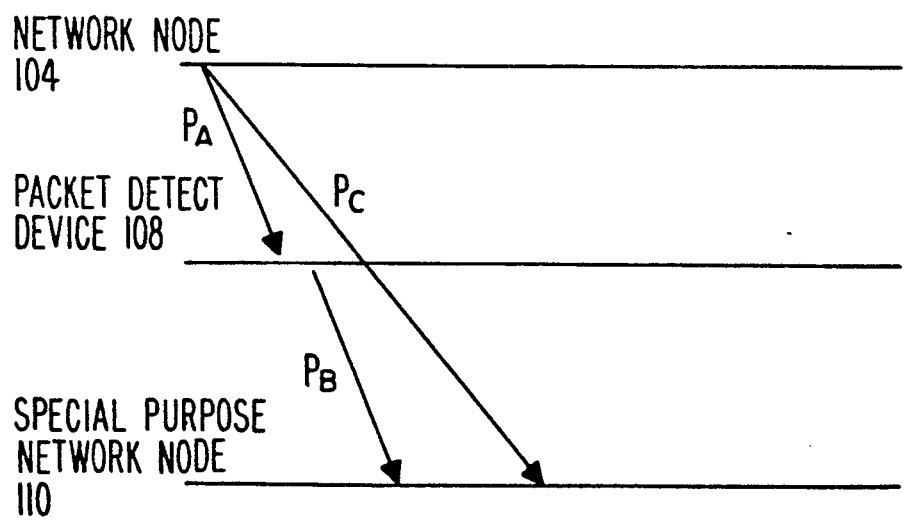
_Fig. 6_

NETWORK DIAGNOSTIC TOOL

BACKGROUND OF THE INVENTION

1. Field of the Invention

The present invention relates generally to a network diagnostic tool and relates particularly, but not exclusively, to a diagnostic tool for mapping the position of network nodes on a local area network (LAN).

2. Description of the Prior Art

It is generally known that the transmission time between a transmission station and respective reception stations of a network may be measured. For example, the invention described in JP-A-601950 requires a transmitting station to perform a transmission to station Y, which then acknowledges, and then a separate transmission to station Y', which then also acknowledges. The transmitting station itself determines the time difference between the respective acknowledgements in order to determine the difference in transmission times to the respective stations. However, the technique described in JP-A-601950 is not suitable for implementing a network diagnostic tool suitable for mapping the position of network nodes on a local area network since it would require every network station to be capable of calculating or implementing an accurate time interval between packet transmissions and receipts. Such a system is impractical for this purpose and would be unnecessarily expensive. It is instead desirable to use a standard network node which need not perform additional operations exclusively for the purpose of diagnostic measurements.

SUMMARY OF THE INVENTION

According to the present invention, a network diagnostic tool is provided for determining the position of a network node along a bidirectional bus, where corresponding data packets from the network node propagate in respective directions along the bus and the time difference between the arrival at respective predetermined locations of the corresponding data packets is detected so that the position of the network node can be determined. Preferably, the predetermined locations are the respective ends of the bus.

The invention may be embodied by attaching a connection to each end of the LAN and monitoring the time at which respective data packets arrive at each of the ends. However, in this case in which a connection is made to each end of the LAN, the delay in the connections themselves must be measured and allowed for in subsequent measurements.

According to another aspect of the invention, a network diagnostic tool is provided for determining the position of a network node along a bidirectional bus, where corresponding data packets from the network node propagate in respective directions along the bus. In this embodiment, a timer is provided for receiving a data packet sent from the network node and which has propagated in one direction along the bus, while an echo station is also provided for receiving the corresponding data packet which has propagated in the opposite direction along the bus. The echo station subsequently sends an echo packet to the timer which is used for calculating the time delay between the arrival of the timer of the data packet and the arrival of the echo packet. From the calculated time delay, the distance between the nodes can be determined. Thus, this aspect of the invention uses the LAN itself to provide communication between timer and echo stations.

The timer and echo station each may preferably comprise means for detecting data packet arrival times and for identifying the source address of arriving data packets. However, the echo station also preferably comprises means for detecting the transmission time of a data relative to a previous data packet's arrival time. As a result, the timer and echo stations may comprise the same hardware components and may each be embodied on a computer card. Preferably, there are separate timer and echo stations connected to opposite ends of the bus.

The present invention also includes a method for determining the position of a network node on a communications network having a bus to which the network node is connected and timer and echo stations connected at opposite ends of the bus. In particular, the method, of the invention includes the steps of sending a data packet and its corresponding data packet from the network node onto the bus so that the data packets propagate in respective directions along the bus, receiving the data packet propagating in one direction at the timer, receiving the corresponding data packet propagating in the opposite direction at the echo station and then subsequently sending an echo data packet in the direction towards the timer, receiving the echo data packet at the timer, and determining the time delay between receipt of the data packet propagating towards the timer and the receipt of the echo data packet at the timer. The method may also include the final step of sending a packet containing echo time information from the echo station to the timer. In addition, the method of the invention may include initially sending a data packet between the timer and the echo station for identifying the network address of the network node under investigation.

In yet another embodiment of the invention, the network diagnostic tool may include a data packet detector connected to a first end of the bus and a timer connected to a second end of the bus such that the timer is capable of data packet detection. A signal may also be transmitted from the data packet detector to the timer to indicate receipt of a data packet by the data packet detector. The timer, on the other hand, may calculate the time difference between the arrival of a corresponding data packet at the second end of the bus and the arrival of the signal indicating receipt of the data packet by the data packet detector. Such a timer may include a first storage device for storing the time of arrival of the signal indicative of the receipt of the data packet by the data packet detector and a second storage device for storing the time of arrival of the corresponding data packet at the second end of the bus. In a preferred embodiment, the timer may comprise a microprocessor system which uses the values stored in the first and second storage devices to calculate the position of the network node along the bus.

BRIEF DESCRIPTION OF THE DRAWINGS

A particular embodiment of the present invention will now be described by way of example, with reference to the accompanying drawings in which:

FIG. 4 is a schematic representation of a network diagnostic tool according to a second embodiment of the present invention;

FIG. 6 is a protocol diagram of the network diagnostic tool of FIG. 4.

DETAILED DESCRIPTION OF THE PRESENTLY PREFERRED EMBODIMENTS

Figure 1:
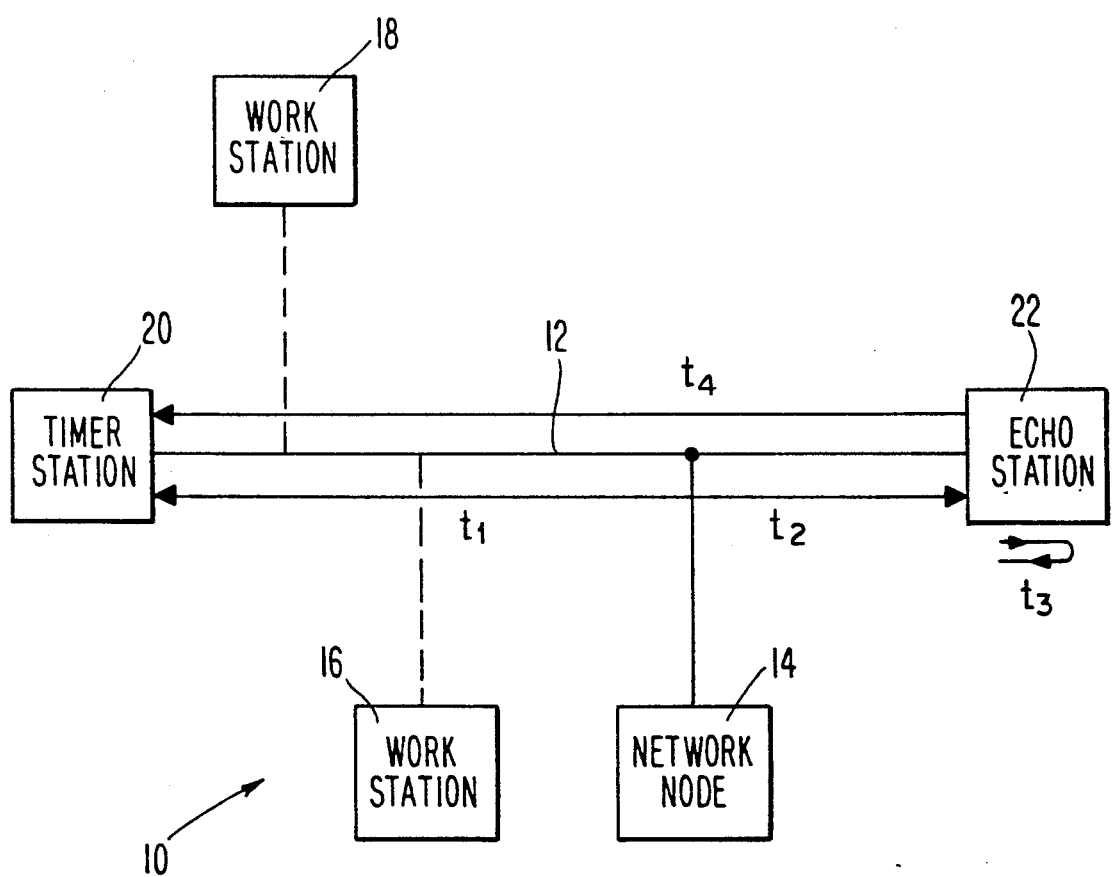
FIG. 1 is a schematic representation of a network diagnostic tool according to a first embodiment of the present invention.

Embodiments of the invention now will be described by way of example with regard to the IEEE 802.3 network, but it should be understood by those of ordinary skill in the art that the invention is also applicable to other types of networks. Like reference materials in the drawings will correspond to similar features throughout the drawing figures, and the scope of the invention will be as indicated by the appended claims.

FIG. 1 shows a LAN 10 generally comprising a shared multi-access bus 12 and several workstations 14, 16, 18, 20 and 22. The workstations 20 and 22 are connected to the ends of the bus 12 and function as timer and echo stations, respectively. The workstation 14 represents the network node whose position is to be determined, while the remaining workstations on the network are shown in dotted lines and will not be discussed further.

The diagnostic tool of the invention is used to determine the position of node 14 along bus 12. In general, the diagnostic tool of the invention operates by starting a timer at the timer station 20 when a data packet from the transmitting workstation 14 arrives after a time t1. A data packet corresponding to this data packet from workstation 14 will also travel towards the echo station 22 for a time t2, where it will be detected. The echo station 22 will then delay a measured time t3 prior to transmitting an echo data packet towards the timer station 20 for a time t4. When this echo data packet reaches the timer station 20, the timer will be stopped. Accordingly, the time measured may be evaluated as:

$$T = (t2 + t3 + t4) - t1.$$

However, since $t4 = t1 + t2$, then $T = 2*t2 + t3$, where t3 is measured by the echo station 22. Thus, if t2 can be determined, the position of the workstation 14 on the LAN can be found.

Communication between the timer station 20 and echo station 22 is needed in order to synchronize activity in determining which workstation is under investigation. Therefore, a communications protocol is required between the timer and echo stations 20 and 22. In a first embodiment of the invention, both the timer and echo stations 20 and 22 may be computers with special purpose LAN interfaces which also allow the LAN to be used for normal communication. In addition, the timer and echo stations 20 and 22 may comprise special purpose time consistent matching hardware for identifying data packets and for enabling data packet transmission after a measured delay. By "time consistent matching hardware" is meant that the time taken to detect the arrival of a data packet is the same for both sets of hardware and that the echo time can be measured consistently. In the resulting arrangement, the data packet matching and timing functions are common to the timer and echo stations 20 and 22; therefore, a common interface card can be designed which performs all the necessary functions of the timer and echo stations 20 and 22.

Figure 2:
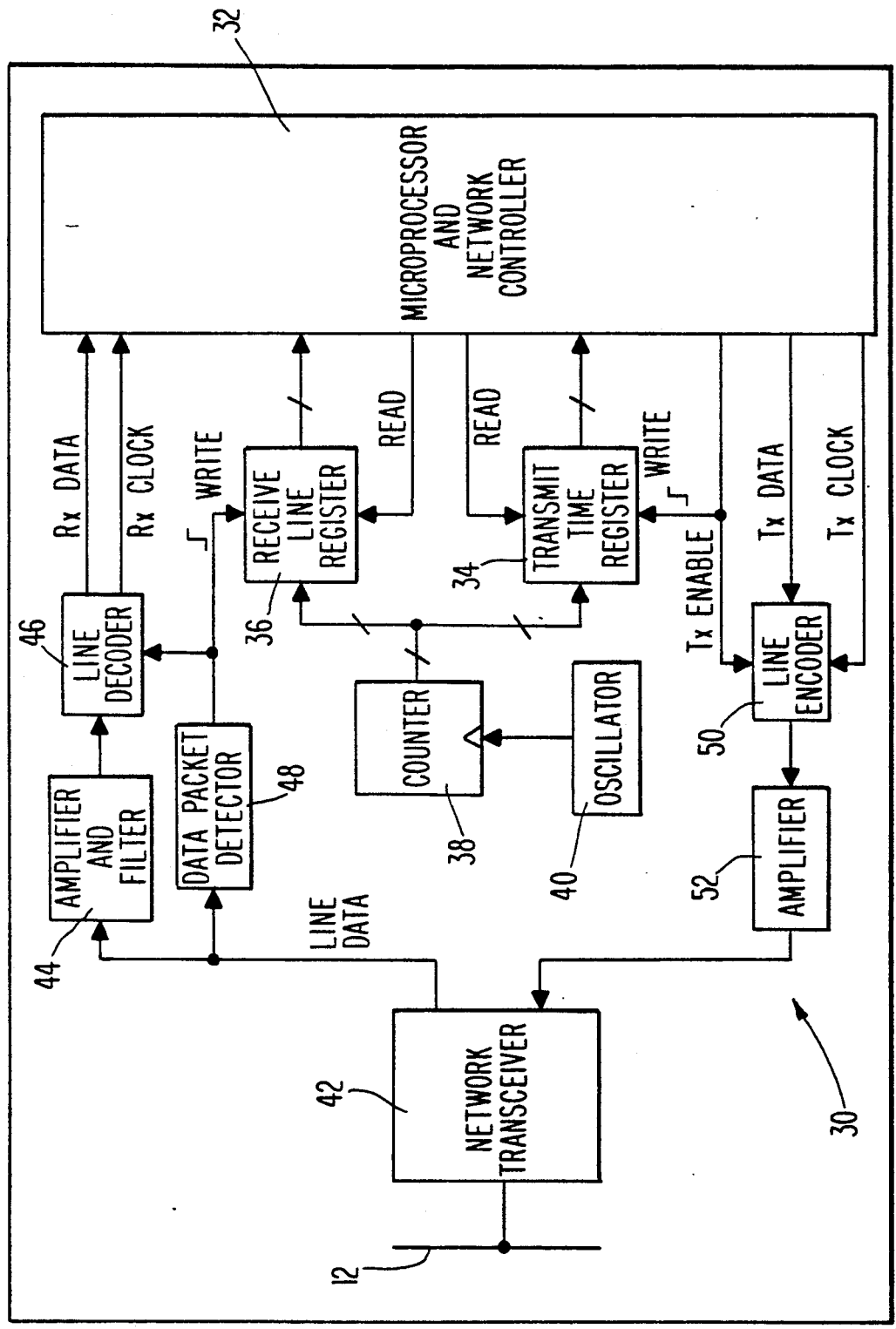
FIG. 2 illustrates the components of the timer and echo devices of the network diagnostic tool of FIG. 1.

In FIG. 2, the timer in the timer station 20 is indicated generally at 30. As shown, the timer 30 generally comprises a microprocessor system and network controller 32, a transmit time register 34, a receive time register 36, a counter 38 and an oscillator 40. The timer 30 communicates with the LAN 10 by means of a network transceiver 42, such as a standard IEEE 802.3 transceiver, although as indicated above, other transceivers may be used in accordance with the invention. Incoming signals are supplied from the transceiver 42 to the microprocessor system 32 via a data receive amplifier and filter 44 and a line decoder 46, such as a Manchester decoder. Incoming signals are also supplied from the network transceiver 42 to the receive time register 36 via a carrier or data packet detect device 48. In addition, signals are supplied from the microprocessor 32 to the network transceiver 42 via a line encoder 50, such as a Manchester encoder, and a transmitter amplifier 52.

For convenience, the echo means in the echo station 22 comprises the same components as the timer 30. Hence, both the timer 30 and the echo means may form part of a computer card. However, as will be understood by those of ordinary skill in the art, the timer 30 does not make use of the transmit time register 34. Also, the "write" signals to the transmit time and receive time registers 34 and 36 must be generated accurately at the point of data packet transmission and reception, respectively.

Figure 3:
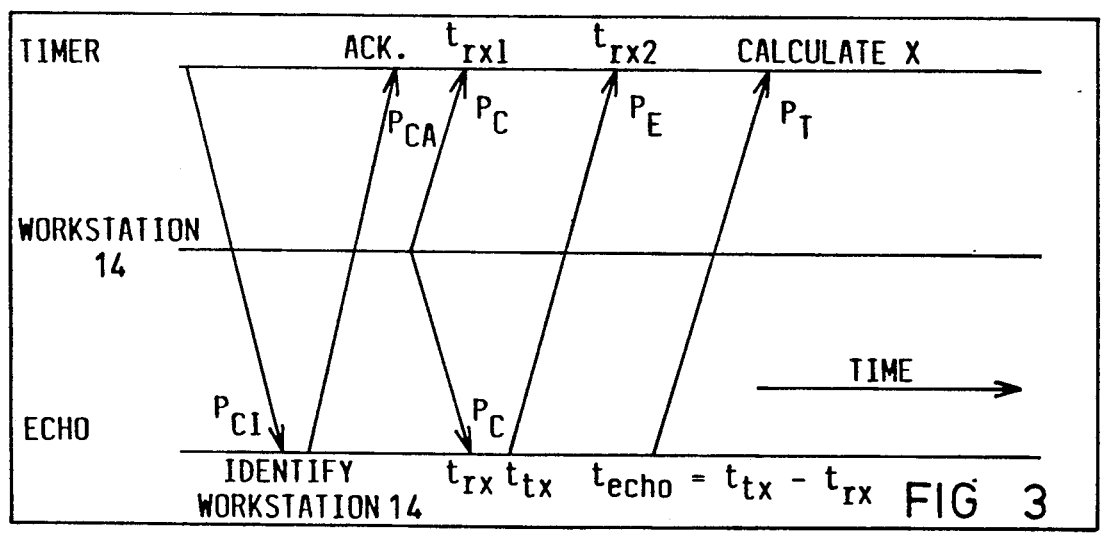
FIG. 3 is a protocol diagram of the network diagnostic tool of FIG. 1.

During operation, the timer and echo stations 20 and 22 so arranged implement the following procedure for finding the position of a node along the LAN. This procedure for the timer station and then the echo station will be described with respect to FIG. 3.

Timer station 20 first transmits a network address data packet ($P_{CI}$) to the echo station 22 for identifying the network address of the workstation 14 and waits for an acknowledgement data packet ($P_{CA}$) from the echo station 22. Timer station 20 then waits the for arrival of a data packet ($P_C$) from the workstation 14; a corresponding data packet is also sent along to echo station 22 concurrently. Timer station 20 then reads the receive time register 36 (FIG. 2), which indicates the time ($t_{rx1}$) of data packet receipt to the required accuracy. Timer station 20 then waits for an echo data packet ($P_E$) from the echo station 22, and when the echo data packet is received, the receive time register 36 is read to indicate the time ($t_{rx2}$) of data packet receipt to the required accuracy. Then, timer station 20 waits for a time delay data packet ($P_T$) from the echo station 22. Time delay data packet $P_T$ carries timing information ($t_{echo}$) from the echo station 22, where $t_{echo}$ may be determined in a relaxed time frame. Finally, microprocessor 32 calculates the physical position of the workstation 14 on the network from the formula:

$$X = \frac{(t_{rx2} - t_{rx1} - t_{echo}) * v}{2}, \quad (1)$$

where x is the distance of the workstation 14 from the echo station 22 along the bus 12, and v is the signal propagation velocity on the network.

Echo station 22 first waits for the network address data packet ($P_{CI}$) from the timer station 20 identifying the network address of the workstation 14, and when network address data packet $P_{CI}$ is received, echo station 22 transmits the acknowledgement data packet (P$_{CA}$) to the timer station 20. Echo station 22 then waits for a data packet (P$_C$) from the workstation 14. When data packet P$_C$ is received, echo station 22 reads the receive time register, 36, which indicates the time (t$_{rx}$) of data packet (P$_C$) arrival. An echo data packet (P$_E$) is then transmitted to the timer station and transmit time register 34 is read to determine the accurate transmit time (t$_{tx}$). Then, microprocessor 32 calculates the time taken to echo (t$_{echo}$) as:

$$t_{echo} = t_{tx} - t_{rx}.$$

Finally, the time delay data packet (P$_T$) is transmitted to the timer station 20, where time delay data pack P$_T$ carries the information t$_{echo}$. The echo station 22 again waits for a network address data packet P$_{CI}$ from timer station 20 before repeating the process.

The system of the invention is arranged so that the data packet matching functions are carried out without tight time constraints. In addition, the system formats all data packets for transmission such that the data packets transmitted from a workstation contain the addresses of their source and destination. Moreover, in practice it may be found to be advantageous for the network diagnostic tool of the invention to be configured so as to echo all data packets received or all data packets received within a selected time period, rather than only to echo data packets from the chosen workstation.

As noted in Equation (1) above, the timing resolution necessary in the timer 30 depends upon the speed of propagation v on the network and the required accuracy of network node position resolution along the bus. For the IEEE 802.3 network, for example, the propagation speed is approximately 0.2 meters per nanosecond, and the minimum recommended distance between any two stations is 2.5 meters. Thus, in order for the timer 30 to differentiate between two stations A and B which are the minimum distance apart, the time T must be measurable as:

$$\begin{aligned} T &= T_a - T_b \\ &= (2*t2_a + t3_a) - (2*t2_b + t3_b) \\ &= 2*(t2_a - t2_b) \text{ (assuming } t3_a = t3_b \text{ approximately)} \\ &= 2*(2.5 \text{ m}/0.2 \text{ m/ns}) \\ &= 25 \text{ ns,} \end{aligned}$$

where the subscript a applies to measurements made in determining the position of station A and subscript b applies to measurements made in determining the position of station B.

In order to provide this timing resolution, the counter 38 (FIG. 2) is required to operate at a frequency equal to or greater than 40 MHz. To provide the necessary accuracy, the counter 38 also must be accurate to greater than 25 ns over the complete interval timed. Since the minimum packet length on an IEEE 802.3 network is 596 bits and the transmission rate is 10 Mbits/s, the counter 38 must time the intervals equivalent to the transmission time of a minimum size packet plus up to twice the end to end propagation delay and the time delay between data packet receipt and data packet transmission at the echo station being measured. If the time between data packet receipt and transmission at the echo station 22 is assumed to be less than 200 microseconds and a 500 m network is assumed, this corresponds to a time interval T of:

$$\begin{aligned} T &= 596 \text{ bits}/(10 \times 10^6 \text{ bits/sec}) + \\ &\quad 2(500 \text{ m}/[0.2 \times 10^9 \text{ m/sec}]) + 200 \times 10^{-6} \text{ sec} \\ &= 265 \text{ microseconds.} \end{aligned}$$

Hence, a 40 MHz crystal oscillator 40 with a frequency accuracy of at least 95 parts per million is required. An increased accuracy could be achieved without increasing the crystal oscillator frequency by averaging over multiple readings.

The embodiment of FIG. 1 thus described provides a network diagnostic tool for ascertaining the position of a network node along a multi-access bus without the need for any external connections to the network. In the embodiment of FIG. 1, it is the timer station 20 which indicates which workstation is under investigation. However, an alternative approach would be to configure the system so that the diagnostic tool can be used in response to an initiating packet from a workstation.

A second embodiment of the present invention will now be described with references to FIGS. 4 to 6. FIG. 4 shows a LAN 100 comprising a multi-access bus 102 and network nodes 104 and 106. Data packets and their corresponding data packets from the network nodes travel in respective directions along the multi-access bus 102. A data packet detect device 108 is connected to the first end of the bus 102 and a timer device in the form of a special purpose network node 110 is connected to the other end of the bus 102. A cable 112 interconnects the data packet detect device 108 and the special purpose network node 110.

The operation of the network diagnostic tool of this embodiment of the invention will now be described with reference to FIGS. 5 and 6. In general, the diagnostic tool of this embodiment operates by first detecting a data packet using data packet detect device 108, and when a data packet is detected, a signal is sent from the data packet detect device 108 to the special purpose network node 110 via the cable 112. The special purpose network node 110 logs the time of arrival (T1) of the data packet. The corresponding data packet which has travelled in the other direction along the multi-access bus 102 is detected by the special purpose network node 110 and its time of arrival (T2) is also logged.

Figure 5:
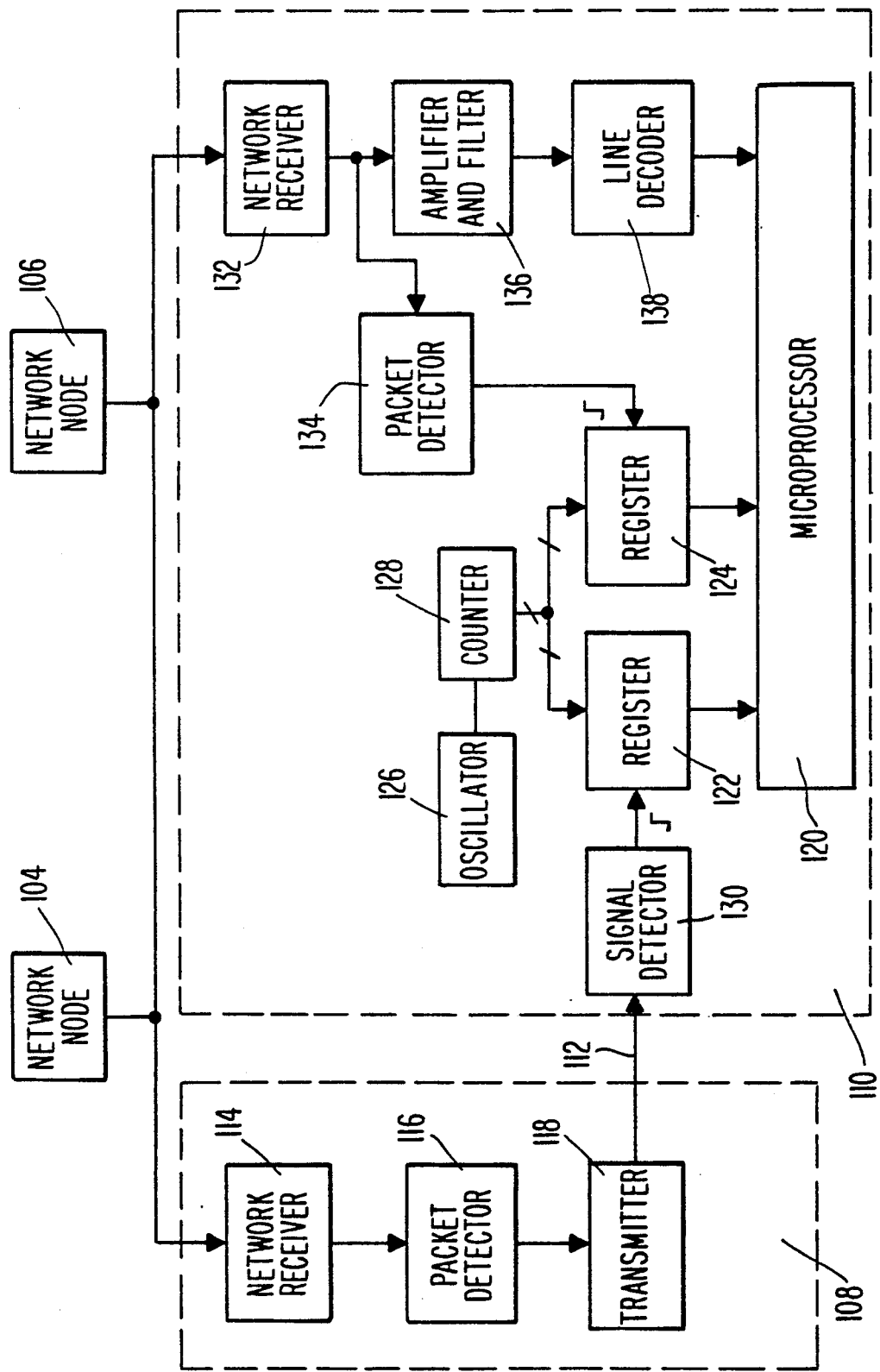
FIG. 5 illustrates the components of the data packet detector and the special purpose network node of the network diagnostic tool of FIG. 4.

In accordance with this embodiment, an initial calibration is required to take account of the time which elapses between both (a) the receipt of a data packet by the network receiver 114 and consequent clocking of the register 122 (tp) (FIG. 5), and (b) receipt of a data packet by the network receiver 132 and consequent clocking of the register 124 (tq) (FIG. 5). The distance (x) of the network node from the end of the bus 102 can then be calculated as follows:

$$x = [(T_2 - t_q) - (T_1 - t_p)] * V,$$

where V is the propagation speed on the network. The sign of x indicates with respect to which end of the bus 102 the calculated distance is to be used.

In FIG. 5, the data packet detect device 108 of this embodiment is shown to comprise a network receiver 114, a data packet detector 116 and a signal transmitter 118. The special purpose network node 110, on the other hand, comprises a microprocessor system 120 which receives timing data from two receive time registers 122 and 124. An oscillator 126 provides clock signals to a counter 128 which is connected to the registers 122 and 124. A signal detector 130 detects signals sent from the signal transmitter 118, via the, cable 112. A network receiver 132 receives data packets from the bus 102 and sends these to a data packet detector 134 connected to the register 124 and also to an amplifier and filter 136. The amplifier and filter 136 is, in turn, connected to a line decoder 138 which supplies signals to the microprocessor system 120.

As shown in FIG. 6, a data packet ($P_A$) emitted from the network node 104 is received by the network receiver 114 which supplies signals to the data packet detector 116. Data packet detector 116 then provides a signal pulse which is amplified by the signal transmitter 118 to produce a signal ($P_B$) which indicates the arrival of a data packet. This signal $P_B$ travels via the cable 112 to the signal detector 130 of the special purpose network node 110, which causes the register 122 to latch the value of the counter 128. The corresponding data packet ($P_C$) arriving at the second end of the bus 102 is transferred via the network receiver 132 to the data packet detector 134, which produces a signal causing the register 124 to latch the value of the counter 128.

The amplifier and filter 136 then transfer signals from the network receiver 132 to the microprocessor system 120 via the line decoder 138 where the transmitted data packet data will be recovered. The microprocessor system 120 identifies the network node source address supplied in the data packet and reads the contents of the registers 122 and 124 after a delay which is longer than the network propagation delay. In effect, the microprocessor 120 is alerted to the arrival of a data packet at the second end of the bus 102 soon after the data packet begins to arrive and then waits for the contents of the registers 122 and 124 to change. Microprocessor 120 then calculates the position of the network node originating the transmitted data packet in accordance with the equation:

$$x = [(T2 - t_q) - (T1 - t_p)] * V,$$

where V is the propagation speed on the network and $t_p$ and $t_q$ are as explained above. The sign of the result indicates whether the calculated distance is with respect to the first or the second end of the bus 102.

In practice, the time taken to transmit or receive a data packet is much greater than the propagation time along the network. This means that there is no real chance of spurious measurements being made as a result of confusion between different data packets sent by a single network node. However, on networks such as the IEEE 802.3 network, which uses a carrier sense multiple access method to control access to the network, data packet collisions can occur. Measurements obtained after a collision is detected would be rejected. Accordingly, an alternative method to solve this problem is to take several measurements for a particular network node and to discount any measurements which differ markedly from the rest. This packet collision problem may not occur on other types of networks, and it will be understood by those skilled in the art that the present invention is applicable to any network or part of a network comprising a continuous multi-access bus.

Although a couple of exemplary embodiments of the invention have been described in detail above, those skilled in the art will readily appreciate that many additional modifications are possible in the exemplary embodiments without materially departing from the novel teachings and advantages of this invention. For example, measurement accuracy and reliability may be improved by taking multiple readings and averaging them. Accordingly, all such modifications are intended to be included within the scope of the invention as defined in the following claims.

We claim:

1. A network diagnostic tool for determining a position of a network node along a bidirectional bus in a network comprising at least said network node and said bus, wherein the network node propagates a data packet and its corresponding data packet in respective directions along the bus, said tool comprising:

packet determining means connected at a first predetermined location along the bus for detecting said data packet propagated by said network node in a first direction along the bus;

timer means connected at a second predetermined location along the bus for detecting said corresponding data packet propagated by said network node in a second direction along the bus;

means for transmitting a signal from the packet detecting means to the timer means indicating receipt by the packet detecting means of said data packet which has propagated in said first direction along the bus; and means for determining the distance of said network node from one of said first and second predetermined locations from an arrival time of said corresponding data packet at said second predetermined location and an arrival time at said second predetermined location of said signal indicating receipt by the packet detecting means of said data packet which has propagated in said first direction along the bus.

2. A network diagnostic tool according to claim 1, wherein said first and second predetermined locations are a first end and a second end of the bus, respectively.

3. A network diagnostic tool according to claim 1, wherein the timer means comprises means for calculating the time difference between arrival of said corresponding data packet at the second predetermined location and the arrival of the signal indicating receipt by the packet detecting means of said data packet which has propagated in said first direction along the bus.

4. A network diagnostic tool according to claim 1, wherein the timer means comprises a first storage means for storing a time of arrival of the signal indicating receipt by the packet detecting means of said data packet which has propagated in said first direction along the bus and second storage means for storing a time of arrival of said corresponding data packet at the second predetermined location along the bus.

5. A network diagnostic tool according to claim 4, wherein the timer means further comprises a microprocessor which utilizes values stored in the first and second storage means to calculate the position of the network node along the bus.

6. A network diagnostic tool according to claim 5, wherein said microprocessor makes several time difference measurements, compares said measurements and discards any measurement which differs markedly from the majority of the measurements.

7. A network diagnostic tool for determining a position of a network node along a bidirectional bus in a network comprising at least said network node and said bus, wherein the network node propagates a data packet and its corresponding data packet in respective directions along the bus, said tool comprising:

timer means for receiving said data packet propagated from the network node in one direction along the bus;

echo means for receiving said corresponding data packet propagated in a direction opposite to said one direction along the bus and for subsequently sending an echo data packet to the timer means; and means for calculating a time difference between the arrival of said data packet and the arrival of said echo data packet at the timer means and for determining from the calculated time difference the distance of said network node from at least one of said timer means and said echo means.

8. A network diagnostic tool according to claim 7, wherein the timer means and echo means each comprises time consistent means for detecting data packet arrival times.

9. A network diagnostic tool according to claim 7, wherein the echo means comprises means for detecting the transmission time of a data packet relative to a previous data packet's arrival time.

10. A network diagnostic tool according to claim 7, wherein the timer means and echo means each comprises the same hardware components.

11. A network diagnostic tool according to claim 10, wherein the timer means and echo means are each embodied on a computer card.

12. A network diagnostic tool according to claim 7, wherein the timer means comprises a timer station connected to a first end of the bus and the echo means comprises an echo station connected to a second end of the bus.

13. A network diagnostic tool according to claim 12, wherein the echo station echoes all data packets which it receives.

14. A network diagnostic tool according to claim 12, wherein the echo station echoes all data packets which it receives during a selected time period.

15. A network diagnostic tool according to claim 7, wherein the timer means and echo means each includes means for identifying a source address of arriving data packets.

16. A method for determining a position of a network node on a communications network comprising a bus to which the network node is connected and timer means and echo means which are connected at opposite ends of the bus, comprising the steps of:

sending a data packet and its corresponding data packet from the network node onto the bus so that said data packet and said corresponding data packet propagate in respective directions along the bus;

receiving said data packet propagating in one direction along said bus at the timer means;

receiving said corresponding data packet propagating in the opposite direction along said bus at the echo means;

upon receipt of said corresponding data packet at the echo means, sending an echo data packet in said one direction along said bus;

receiving the echo data packet at the timer means;

determining a delay between receipt of said data packet propagating in said one direction and receipt of the echo data packet at the timer means; and determining from the time delay the distance of said network node from at least one of said timer means and said echo means.

17. A method according to claim 16, comprising the further step of sending a time delay data packet containing echo time information identifying a delay between receipt of said corresponding data packet at the echo means and transmission of said echo data packet from the echo means to the timer means.

18. A method according to claim 16, comprising the further step of initially sending a network address data packet from the timer means to the echo means identifying the network address of the network node.

19. A method for determining a position of a network node on a bidirectional communications bus to which the network node is connected, comprising the steps of:

sending a data packet and its corresponding data packet from the network node onto the bus so that said data packet and said corresponding data packet propagate in respective directions along the bus;

detecting, at a first predetermined location along the bus, said data packet propagated by said network node in a first direction along the bus;

detecting, at a second predetermined location along the bus, said corresponding data packet propagated by said network node in a second direction along the bus;

transmitting a signal from the first predetermined location to the second predetermined location indicating receipt of said data packet which has propagated in said first direction along the bus; and determining the distance of said network node from one of said first and second predetermined locations from an arrival time of said corresponding data packet at said second predetermined location and an arrival time at said second predetermined location of said signal indicating receipt of said data packet which has propagated in said first direction along the bus.

* * * * *